United States Patent [19]

Murrer et al.

[11] Patent Number: 4,469,849

[45] Date of Patent: Sep. 4, 1984

[54] METHOD FOR THE HYDROGENATION OF EMULSIFIED UNSATURATED ORGANIC COMPOUNDS

[75] Inventors: Barry A. Murrer, Henley on Thames; John W. Jenkins, Chalkhouse Green Near Reading, both of England

[73] Assignee: Johnson Matthey & Co., Limited, London, England

[21] Appl. No.: 467,920

[22] Filed: Feb. 18, 1983

Related U.S. Application Data

[63] Continuation of Ser. No. 235,856, Feb. 19, 1981, abandoned.

[30] Foreign Application Priority Data

Feb. 25, 1980 [GB] United Kingdom ............... 8006235

[51] Int. Cl.$^3$ ............................................. C08F 8/04

[52] U.S. Cl. ................................... 525/339; 525/338; 585/273; 585/275

[58] Field of Search ............... 525/338, 339; 585/250, 585/273, 274, 275, 276, 277

[56] References Cited

U.S. PATENT DOCUMENTS

| | | |
|---|---|---|
| 3,898,208 | 8/1975 Krause | 525/338 |
| 3,993,855 | 11/1976 Kang | 525/338 |
| 4,271,323 | 6/1981 Durand | 525/338 |

*Primary Examiner*—Paul R. Michl
*Attorney, Agent, or Firm*—Cushman, Darby & Cushman

[57] ABSTRACT

A process for the hydrogenation of an unsaturated organic compound in emulsion comprises contacting the emulsion with gaseous or dissolved hydrogen in the prescence of a hydrogenation catalyst in solution.

4 Claims, No Drawings

METHOD FOR THE HYDROGENATION OF EMULSIFIED UNSATURATED ORGANIC COMPOUNDS

This is a continuation of Ser. No. 235,856 filed Feb. 19, 1981 now abandoned.

This invention relates inter alia to the stabilisation of polymers. It is particularly concerned with a method of treating polymer emulsions so that solid polymers obtained from emulsions so treated shall have enhanced stability. In its widest aspect, however, the invention relates generally to the hydrogenation of emulsified unsaturated organic compounds.

By an "unsaturated organic compound" both here and throughout the remainder of this specification is meant an organic compound the molecule of which contains one or more multibond linkages from one carbon atom to another carbon atom or to any oxygen, sulphur or nitrogen atom. Where the multibond linkage or linkages are from one carbon atom to another carbon atom, such linkage or linkages may be olefinic or acetylenic.

By an "emulsified unsaturated organic compound" both here and throughout the remainder of the specification is meant an "unsaturated organic compound" as just defined which is in the form of an emulsion in some suitable liquid such as water.

In this specification the word "polymer" and its derivatives are to be taken as referring to any class or type of polymer or copolymer.

The structural and engineering uses of polymeric materials continue to expand. These materials are, for example, used in such widely diverse applications as structural panels for automobiles, piping of all kinds, wire insulation and protective paint coverings. In applications of this type the polymers are required to retain their mechanical and physical properties for long periods under what, for many polymers are often relatively hostile environmental conditions and this has limited the range of polymers that it has hitherto been possible to employ for these purposes.

In particular, polymers containing reactive carbon-carbon double bonds are highly susceptible to oxidative degradation and this leads to structural weakness in these polymers. The effect is enhanced, if not initiated when such polymers are exposed to ultra-violet radiation such as that in sunlight, for example.

An object of the present invention is to provide a method of countering the above described susceptibility to oxidative degradation of certain polymers and thereby to increase the range of polymers which may be used for structural and engineering purposes.

One way of countering this susceptibility is to hydrogenate the carbon-carbon double bonds in the polymers concerned and, indeed, methods of doing this are disclosed in our British patent application published under Ser. No. 2011911A. These methods comprise contacting a solution of the polymer concerned with gaseous or dissolved hydrogen in the presence of a heterogenous, particulate, supported catalyst comprising one or more of the platinum group and other metals and alloys thereof.

These methods however, have certain disadvantages. Chief among these is the fact that relatively large amounts of solvent are required to dissolve the polymer and this makes the method economically unattractive on a large scale.

A further object of the invention is accordingly to provide a method for the selective catalytic hydrogenation of a polymer which method is not subject to the foregoing disadvantage.

Many polymers are made by the process of emulsion polymerisation and may be obtained in the form of aqueous emulsions from which the polymers may be recovered by precipitation or coagulation by the addition of one or more suitable reagents. We have now found that the carbon-carbon double bonds in the polymer in such an emulsion can readily be hydrogenated by means of a homogeneous catalyst. We have also found that the process may be facilitated by carrying it out in the presence of one or more solvents which cause the polymer particles to swell and thereby to make the double bonds more accessible to the catalyst.

In addition, we have found that the carbon-carbon double bonds in other organic compounds in the form of emulsions may be hydrogenated by means of homogeneous catalysts. Organic compounds to which this is particularly applicable are the natural oils.

According to the invention, therefore, a process for the hydrogenation of the multibond linkages in an unsaturated organic compound (as hereinbefore defined) comprises contacting the said compound in the form of an emulsion with gaseous or dissolved hydrogen in the presence of a hydrogenation catalyst in solution.

The organic compound may comprise a polymer having a residual carbon-carbon double bonds or it may comprise a natural oil.

Preferably:
(I) one or more solvents for the organic compound are added to the emulsion prior to or at the same time as the catalyst;
(II) the organic compound is emulsified with an aqueous medium, for example water;
(III) the catalyst is dissolved in an organic solvent;
(IV) the catalyst is ionic in nature.

Where the organic compound is an oil, for example soyabean oil, the catalyst is preferably dissolved in an aqueous solvent and the solution is emulsifed with the oil.

Suitable catalysts for use in this invention comprise complexes of rhodium including as ligand an organic compound having in the molecule a Group 5B or 6B element. Examples are those disclosed and claimed in our British Pat. No. 1138601 and which have the general formula $Rh(X)(R'R''R''' Y)_3$ in which Y is a Group 5B or 6B element, preferably phosphorus, arsenic or antimony, X is a halide or pseudohalide, and R', R" and R''' are hydrocarbon groups which may be the same or different. Preferably the R groups are aryl groups and X is halide. A typical example is tris (triphenylphosphine) rhodium chloride $[(Ph_3P)_3RhCl]$. A typical example of an ionic catalyst is bis(triphenylphosphine) rhodium cycloocta-1,5-diene tetrafluoroborate, $[(Ph_3P)_2Rhcod] + [BF_4] -$. Other suitable catalysts include, for example, hydrido carbonyl complexes of rhodium with triphenylphosphine ligands, for example $Rh(H)(CO)(PPh_3)_3$ and $Rh(H)(CO)(PPh_3)_2$.

The invention will now be described, by way of example only, with reference to the hydrogenation of ABS [(AcrylonitrileButadiene-Styrene)] co-polymer.

ABS co-polymers are prepared by a two stage emulsion polymerisation process. In the first stage butadiene is polymerised in an aqueous solution of an anionic detergent to give particles of polybutadiene surrounded by a layer of soap molecules. Acrylonitrile and styrene are then added, together with an initiator, which results in a soap-stabilised emulsion of butadiene particles cro,-linked with acrylonitrile-styrene co-polymer. The emulsion may be coagulated by acidification or by the addition of water miscible organic solvents. Samples of such an emulsion containing 32.32% solids were used in the following examples.

Further, the degree of hydrogenation in the polymers in these examples was determined by infra-red absorption and nuclear magnetic resonance spectroscopy, the determination when using the first of these being carried out in accordance with the following method. First, the emulsion is coagulated by pouring it into methanol and the polymer thereby precipitated, collected, washed with methanol and dried. Next, 50 mg of the washed and dried polymer is dissolved in 3 ml of chloroform and the solution poured into a flat-bottomed dish and allowed to evaporate over a period of about 30 minutes. The resulting clear film is then peeled off the bottom of the dish and the infra-red absorption spectrum taken. A peak due to out of plane deformation of trans-disubstituted double bonds is obtained at 970 $cm^{-1}$ together with peaks at 1000 and 915 $cm^{-1}$ respectively due to out of plane deformation of mono substituted olefin(vinyl group). Cis-disubstituted double bonds are also probably present but the region where they would be expected to absorb infra-red energy (ca 700–800 $cm^{-1}$) is masked by bands due to aromatic rings. However, since it is known that with homogenous catalysts the rates (k) of hydrogenation of substituted olefins are in the order k(vinyl)>>k(cis)>k(trans) olefins, any change in the height of the peak at 970 $cm^{-1}$ (corresponding to the hydrogenation of trans olefins) means that there are corresponding, and proportionately larger hydrogenations of the cis olefins and vinyl groups. Certainly, loss of the peak at 970 $cm^{-1}$ can be taken as a good indication of the complete hydrogenation of vinyl groups and cis olefins.

Monitoring the height of the peak (the intensity of the band) at 970 $cm^{-1}$ thus gives an indication of the extent of the hydrogenation of the polymer. This was done in practice by comparing the intensity of the 970 $cm^{-1}$ band with that of the 1030 $cm^{-1}$ band in treated and untreated samples of the polymer. Since the intensity of the 1030 $cm^{-1}$ is unchanged as a result of the hydrogenation, this intensity is used as an internal reference standard and permits a comparison of the intensities of the two 970 $cm^{-1}$ bands to be obtained. However, because this is a linear extrapolation, the values obtained thereby for the extent of hydrogenation are likely to be lower than the true values. This is because the relationship between band intensity and extent of hydrogenation (concentration of absorbing species) follows the Beer-Lambert law. Although accurate values for the extent of hydrogenation cannot therefore be obtained by infra-red absorption spectroscopy, the method does, nevertheless, give an indication of the extent of hydrogenation. The technique is rapid and simple and will also show if any reduction of nitrile and aromatic groups has also taken place.

The extent of hydrogenation was also determined by NMR spectroscopy. For this purpose, the polymer was obtained in the washed and dried condition as before, following which 30 mg of it was dissolved in 0.4 ml of $CDCl_3$ and the 60 MHz NMR spectrum obtained. Aromatic protons give rise to a broad resonance at $\delta$ 7.2–6.5 ppm, olefinic protons at $\delta$ 5.6–4.9 ppm and the remaining protons at $\delta$ 3.0–1.0 ppm. Integration of the spectrum and comparison of this value with the integral of the spectrum for the unhydrogenated polymer, thus gives a direct and reliable method for the determination of the extent of hydrogenation of double bonds.

EXAMPLE 1

A 5 ml sample of ABS emulsion was hydrogenated in a 50 ml capacity rocking autoclave as follows. An equal volume (5 ml) of water was first added to the emulsion sample and the resulting liquid placed in the autoclave. Next, nitrogen gas was bubbled through the liquid for about 10 minutes to remove oxygen from it and a solution of 20 mg of the catalyst, $(Ph_3P)_3Rhcl$, in 5 ml acetone and 5 ml toluene was added. The bubbling of nitrogen gas was continued for 5 minutes, the autoclave assembled, purged with nitrogen four times by pressurising it to 15 atm and venting, similarly purged with hydrogen gas twice and finally filled with hydrogen gas at 15 atmospheres and closed. The rocking of the autoclave was then started and the contents heated to 70° C. following which the rocking was continued for six hours at the rate of 1 rocking movement per second, with the temperature maintained at 70° C.

The autoclave was then allowed to cool and on reaching room temperature it was opened and the contents poured into a beaker. A layer of the catalyst solution in the organic solvents formed on the surface of the emulsion and was decanted therefrom, the rhodium thereafter being recovered from the solution and re-used. Next, the emulsion was coagulated by pouring it into acidified methanol and then recovered washed and dried as described above in connection with the method of taking infra-red spectra. Finally the extent of hydrogenation of the polymer thus obtained was determined by infra-red and NMR spectroscopy. These showed that 20% hydrogenation of the trans double bonds had been achieved. In this experiment the organic solvents used for the catalyst were also solvents for the polymer. They had the effect of causing the polymer particles to swell thereby making the double bonds more accessible to the catalyst.

EXAMPLE 2

The process of Example 1 was repeated but at a temperature of 100° C. The determination of the extent of the hydrogenation of the trans double bonds by IR and NMR spectroscopy gave a figure of 40%.

EXAMPLE 3

The process of Example 1 was repeated but with the $(Ph_3P)_3RhCl$ catalyst replaced by $[(Ph_3P)_2Rhcod]^+[BF_4]^-$. With this catalyst, the extent of the hydrogenation of the trans double bonds was found to be 70%.

As in Example 1, the acetone and toluene used to dissolve the catalyst were also solvents for the polymer particles thus causing them to swell and thereby increasing the accessibility of the double bonds to the catalyst.

EXAMPLE 4

In this Example, the process of Example 3 was repeated twice but with the 5 ml of acetone and 5 ml of toluene used as a solvent for the catalyst replaced by:
(i) 1 ml acetone and 5 ml toluene and
(ii) 2 ml acetone and 2 ml toluene
The results were:
(i) 26% trans double bond hydrogenation and (ii) 32% trans double bond hydrogenation In none of the above examples was there any evidence of the hydrogenation of nitrile or aromatic groups.

An advantage of using the ionic catalyst [(Ph$_3$P)$_2$Rh cod]$^+$[BF$_4$]$^-$ in examples 3 and 4 is that this is readily soluble in the solvents employed. Further, its ionic nature means that the rhodium may be readily recovered by an ion exchange process.

We believe that if the processes of the above examples had been carried on for a sufficient length of time, the degree of hydrogenation of the trans double bonds achieved would have tended progressively towards 100%.

Although the invention has been described with reference to the hydrogenation o ABS polymer emulsions, it is to be understood that it is not by any means so limited. Indeed it may be used for the hydrogenation of other emulsified unsaturated organic compounds (as hereinbefore defined) including emulsions of other polymers.

We claim:

1. In a process for the hydrogenation of an ABS polymer by treatment with hydrogen in the presence of a catalyst, the improvement comprising contacting the polymer in the form of an emulsion with gaseous or dissolved hydrogen in the presence of a hydrogen catalyst selected from the group consisting of tris (triphenylphosphine, rhodium chloride [(Ph$_3$P)$_3$RhCl)], bis (triphenylphosphine) rhodium cycloocta-1,5-diene tetrafluoroborate [(Ph$_3$P)$_2$ Rh cod]$^+$[BF$_4$]$^-$, Rh HCO (PPh$_3$)$_3$ and RhHCO(PPh$_3$)$_2$, the said catalyst being dissolved in a liquid which is substantially immiscible in the liquid forming the emulsion of the copolymer and which is adapted to act as a swelling agent for the copolymer thereby to increase the accessibility of the copolymer double bonds to the catalyst allowing the hydrogen process to proceed to completion, allowing the reaction mixture to separate into a two layer liquid system without the addition of any reagent, one layer comprising the solution of the catalyst and the other layer comprising an emulsion of the hydrogenated copolymer and, thereafter, removing at least one of the two layers of the said two layer liquid system and treating the material of that layer which contains the hydrogenated ABS polymer with an alcohol so as to coagulate the hydrogenated ABS copolymer and thereby to facilitate its removal from the liquid.

2. A process according to claim 1 wherein the emulsion is an aqueous emulsion.

3. A process according to claim 1 wherein the catalyst is dissolved in a mixture of acetone and toluene.

4. A process according to claim 1 wherein the hydrogenated ABS copolymer is coagulated by treatment in acidified methanol.

* * * * *

UNITED STATES PATENT AND TRADEMARK OFFICE
CERTIFICATE OF CORRECTION

PATENT NO. : 4,469,849

DATED : September 4, 1984

INVENTOR(S) : Barry A. Murrer and John W. Jenkins

It is certified that error appears in the above-identified patent and that said Letters Patent is hereby corrected as shown below:

[57] ABSTRACT, line 4, correct spelling of "presence"

Claim 1 (column 6, line 9), after "catalyst" insert a comma --,--
(column 6, line 10), change "hydrogen" to
--hydrogenation--

Signed and Sealed this

Ninth Day of April 1985

[SEAL]

Attest:

DONALD J. QUIGG

Attesting Officer    Acting Commissioner of Patents and Trademarks